US006430530B1

(12) United States Patent
Ng

(10) Patent No.: US 6,430,530 B1
(45) Date of Patent: Aug. 6, 2002

(54) APPARATUS FOR AUTOMATICALLY PROCESSING BOTH ENCODED AND UNENCODED DATA

(75) Inventor: Alan Ng, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/397,617

(22) Filed: Sep. 16, 1999

(51) Int. Cl.$^7$ .............................................. G10L 19/02
(52) U.S. Cl. ........................ 704/229; 704/219; 704/222; 704/230; 704/266; 341/51; 709/231; 709/219; 709/236; 375/240.25; 340/825.5
(58) Field of Search ............................... 341/51, 79, 67; 704/220, 230, 219, 229, 222, 266; 709/231, 219, 236, 250; 358/1.1; 711/208; 340/825.5; 375/240.25

(56) References Cited

U.S. PATENT DOCUMENTS

| | | | | |
|---|---|---|---|---|
| 3,997,718 A | * | 12/1976 | Ricketts et al. | 178/6.8 |
| 4,704,728 A | * | 11/1987 | Scheiber | 381/22 |
| 4,891,839 A | * | 1/1990 | Scheiber | 381/22 |
| 6,195,024 B1 | * | 2/2001 | Fallon | 341/51 |
| 6,309,424 B1 | * | 10/2001 | Fallon | 341/51 |

\* cited by examiner

*Primary Examiner*—Vijay B Chawan
(74) *Attorney, Agent, or Firm*—John F. Schipper

(57) ABSTRACT

An apparatus for automatically rendering both encoded and unencoded data files comprises a data processor and a decoder. The data processor receives a set of input data from a storage medium, such as an optical storage medium, and determines whether the set of input data is encoded or unencoded. If the input data is encoded, then the data processor provides to the decoder a set of encoded data, and generates an indication signal to cause the decoder to be activated. In response, the decoder decodes the set of encoded data and provides as output a set of decoded data. This decoded data may then be provided to a signal transport mechanism, such as a digital signal bus, to be rendered by a digital device such as a computer, or to a digital to analog converter which converts the decoded data into analog signals for driving an analog device, such as a speaker. On the other hand, if the data processor determines that the input data is unencoded, then the data processor processes the set of input data to derive a set of processed data, and provides this set of processed data at its output. No indication signal is generated; thus, the decoder is not activated. The processed data may then be provided to a signal transport mechanism, such as a digital signal bus, to be rendered by a digital device such as a computer, or to a digital to analog converter which converts the processed data into analog signals for driving an analog device, such as a speaker. Regardless of whether the input data is encoded or unencoded, the apparatus automatically renders it properly to a user.

13 Claims, 2 Drawing Sheets

APPARATUS FOR AUTOMATICALLY PROCESSING BOTH ENCODED AND UNENCODED DATA

FIELD OF THE INVENTION

This invention relates generally to digital processing systems and more particularly to an apparatus for automatically processing both encoded and unencoded data.

BACKGROUND OF THE INVENTION

Optical storage media, such as CD, CD-ROM, CDR, CDR/W, DVD, and MD, have been used for a number of years by the entertainment industry as a mechanism for delivering products, such as digitized movies and music, to consumers. With optical media, it is possible to deliver vast amounts of data (for example, a typical compact disk (CD) has a storage capacity of approximately 660 megabytes) to consumers at a relatively low cost.

In recent years, the Internet has begun replacing optical media as the delivery mechanism of choice for digitally-based products. With the Internet, it is no longer necessary to deliver a physical disk to a consumer; rather, the consumer can directly download the product via the Internet onto his/her own storage device, which may, for example, be a hard disk on a computer or an optical storage disk (such as a CDR or CDR/W disk). Once downloaded, the digitally-based product may be rendered or played using a rendering device, such as a CD player, a computer, or some other device. Because the Internet enables direct downloads, delivery of the product is typically faster, and consumer gratification is much more immediate.

Downloading does not come without its problems, however. One major problem is the significant length of time needed to download a file. As an example, a 4-minute song, which usually is approximately 40MB in size, requires over three hours to download using a 28.8 kbps modem. For most consumers, this is an intolerably long period of time.

To alleviate this problem, some mechanisms have been developed to reduce the size of files prior to download, thereby reducing the amount of time needed to download the files. In the audio data file arena, one such mechanism is the MP3 mechanism developed by the Motion Picture Experts Group (MPEG). MP3, also known as MPEG Audio Layer-3, uses a perceptual noise shaping coding scheme to reduce the number of bits needed to represent an audio file. With MP3, it is possible to reduce the size of an audio file by a factor of ten to twelve so that a song that formerly required hours to download now takes only minutes to acquire.

A point to note regarding MP3 is that, although it does significantly reduce the size of an audio file, it is more an encoding scheme than a compression algorithm, and as with any encoding scheme, it requires a decoder on the receiving end to render the encoded file. That is, the consumer downloading an MP3 file needs to have an MP3 decoder in order to render or play the downloaded file. Typically, an MP3 decoder takes the form of a decoder program on a computer. To render an MP3 file, a consumer executes the decoder program and instructs it to decode a file stored in memory or on a hard drive. Once decoded, the audio file is rendered to the consumer via the computer's sound system. Dedicated MP3 players have also been developed. This type of player interfaces with a memory module, such as a flash memory card, to access an MP3 file stored thereon, and then decodes and plays the file.

Whatever form an MP3 decoder takes, one point is clear: an MP3 file has a very different format than a regular audio data file. Thus, an MP3 decoder cannot render a regular audio data file, and a regular audio data file rendering mechanism (such as a CD player) cannot render an MP3 file. As a result, in order to render both types of files, a consumer needs to have two different sets of equipment, one for rendering MP3 files and another for rendering unencoded files. This imposes additional cost on the consumer, which in turn, encourages the consumer to choose between the two formats and to adopt only one. This is an undesirable result. What is needed instead is a mechanism that can automatically detect and render both types of files.

SUMMARY OF THE INVENTION

The present invention provides an apparatus for automatically rendering both encoded and unencoded data files. According to one embodiment, the present invention comprises a data processor and a decoder. The data processor receives a set of input data from a storage medium, such as an optical storage medium, and determines whether the set of input data is encoded or unencoded.

If the input data is encoded (for example, in accordance with the MP3 encoding scheme), then the data processor provides to the decoder a set of encoded data, and generates an indication signal to cause the decoder to be activated. In response, the decoder decodes the set of encoded data and provides as output a set of decoded data. This decoded data may then be provided to a signal transport mechanism, such as a digital signal bus, to be rendered by a digital device such as a computer, or to a digital-to-analog converter which converts the decoded data into analog signals for driving an analog device, such as a speaker. In either case, the encoded data is automatically transformed to enable it to be successfully rendered.

On the other hand, if the data processor determines that the input data is unencoded (for example, has a standard audio file format, such as WAVE), then the data processor processes the set of input data to derive a set of processed data, and provides this set of processed data at its output. No indication signal is generated; thus, the decoder is not activated. The processed data may then be provided to a signal transport mechanism, such as a digital signal bus, to be rendered by a digital device such as a computer, or to a digital-to-analog converter which converts the processed data into analog signals for driving an analog device, such as a speaker. The unencoded data is thus processed and rendered.

As disclosed above, the present invention is capable of processing both encoded and unencoded data from a storage medium. Thus, With the present invention, a user is no longer required to have two different devices in order to render both types of data. Instead, the single apparatus of the present invention may be used. As a result, the user is free to adopt both the encoded and unencoded data formats. Further, the user may use the same apparatus to render both data formats. This is a significant improvement over the prior art.

DETAILED DESCRIPTION OF THE EMBODIMENT(S)

Figure 1:
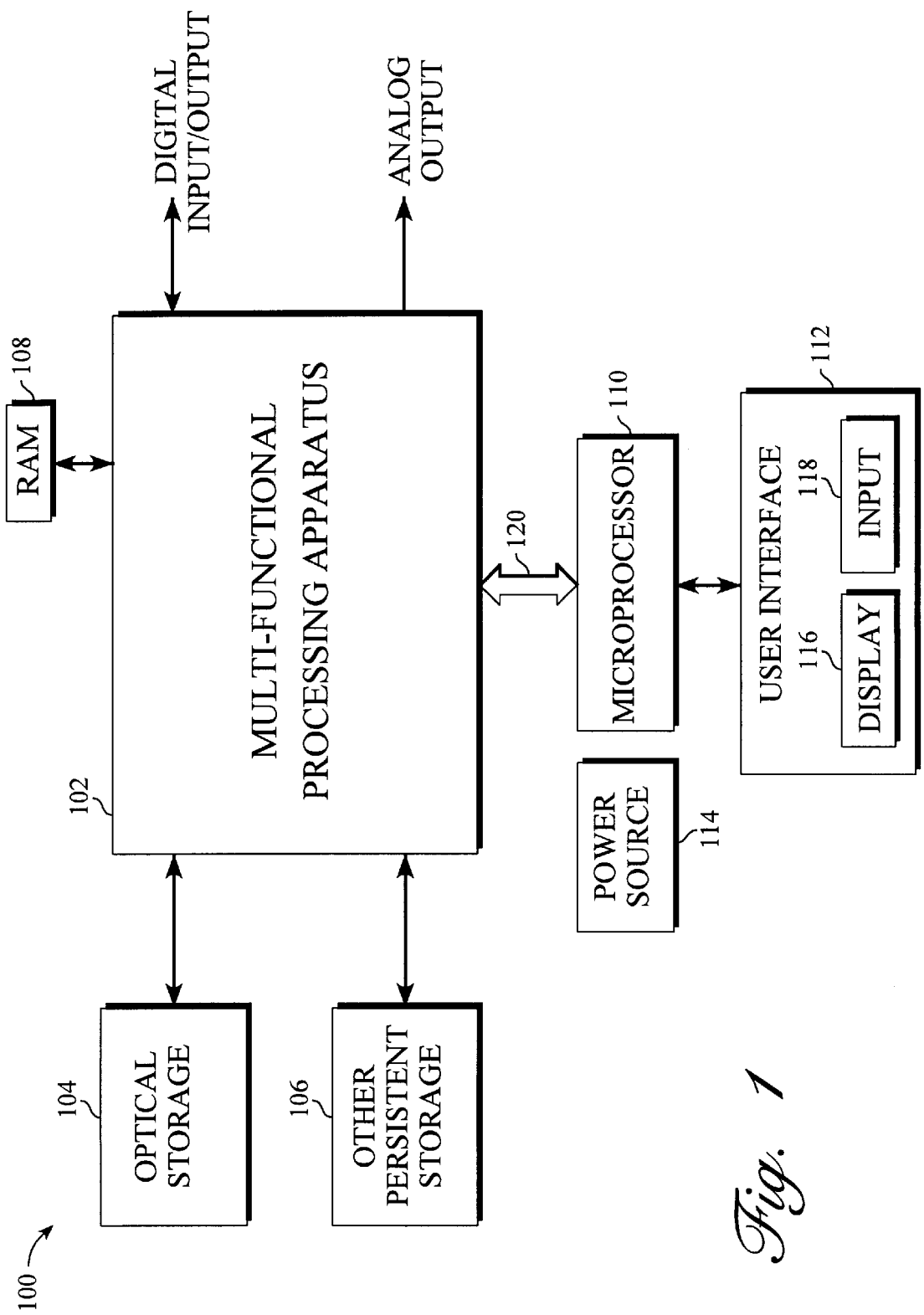
FIG. 1 is a block diagram of a system in which the multi-functional processing apparatus of the present invention may be implemented.

With reference to FIG. 1, there is shown a system 100 in which the present invention may be implemented, the system 100 including the multi-functional processing apparatus 102 of the present invention (hereinafter, apparatus 102), and a plurality of other components coupled to the apparatus 102. One such component is optical storage 104. In one embodiment, optical storage 104 comprises an optical storage medium and an accessing mechanism (e.g. a servo mechanism and a laser) for accessing information on the medium. For purposes of the present invention, the optical storage medium may be any type of optical storage medium including but not limited to compact disk (CD), compact disk read only memory (CD-ROM), compact disk recordable (CDR), compact disk read/write (CDR/W), digital video disk (DVD), and mini disk (MD).

The optical storage medium may store one or more data files which serve as input data files for the apparatus 102. In the following discussion, it will be assumed for the sake of illustration that the data files are audio data files (e.g. music, speech, etc.); however, it should be noted that for purposes of the present invention, the data files may be of other types, including but not limited to, video and audio/video data files. The data files stored on the optical storage medium may be encoded or unencoded. If encoded, the data files may be encoded in accordance with any desired encoding scheme, including but not limited to MP3. If unencoded, the data files may be in any standard audio file format, including but not limited to WAVE. Regardless of whether the data files are encoded or unencoded, the apparatus 102 will be able to process them.

Also coupled to the apparatus 102 may be another persistent storage 106. In one embodiment, persistent storage 106 may be any type of storage other than optical storage, including but not limited to non-volatile memory, flash memory, magnetic disk, and PCMCIA card. Persistent storage 106 may store one or more data files in encoded or unencoded form. To provide protection against copying, the data files stored on the optical storage 104 and the persistent storage 106 may be encrypted. If that is the case, then the apparatus 102 will decrypt the data files prior to processing them. This will be discussed in more detail in a later section. Together, the optical storage 104 and the persistent storage 106 behave as the input data sources for the apparatus 102.

The apparatus 102 receives the audio data files from the storages 104, 106, and processes them to provide output signals which may be used to render or play the audio data files to a user. The apparatus 102 is capable of providing the output signals in both analog and digital form. The digital output signals may be provided to a digital device, such as a computer or a USB speaker, for rendering to a user. The analog signals may be provided to an analog device, such as a speaker, to drive the device.

In processing the audio data files, the apparatus 102 interacts with a random access memory (RAM) 108 and a microprocessor 110. The RAM 108 is used by the apparatus 102 as temporary storage for facilitating processing of the data files. The microprocessor 110, in one embodiment, is used to control the operation of the apparatus 102. In performing the controlling function, the microprocessor 110 is coupled to the apparatus 102 via a microprocessor bus 120, and is also coupled to a user interface 112 for receiving input from and providing output to a user. The user interface 112 comprises a display 116 for providing output information (e.g. status information or operating instructions) to a user, and an input mechanism 118 for receiving input or instructions from the user. The input mechanism 118 may comprise, for example, a keyboard or a set of command buttons for receiving commands from the user. The microprocessor 110 controls the operation of the apparatus 102 in response to user input. For example, if the user indicates that he/she wishes to play a certain song on the optical storage 104, then the microprocessor 110 sends the appropriate control signals to the apparatus 102 to cause the song to be rendered. The microprocessor 110 also controls the operation of the apparatus 102 in response to control signals generated by the apparatus 102 itself This interaction between the microprocessor 110 and the apparatus 102 will be described in greater detail in a later section.

In addition to the components already described, the system 100 further comprises a power source 114 for providing power to the apparatus 102 and the other components in the system 100. If the system 100 is implemented as a portable system (e.g. a portable music player), then the power source 114 may take the form of one or more batteries. If the system 100 is implemented as part of an overall larger system, then the power source 114 may be power from a signal bus, such as a universal serial bus (USB).

Figure 2:
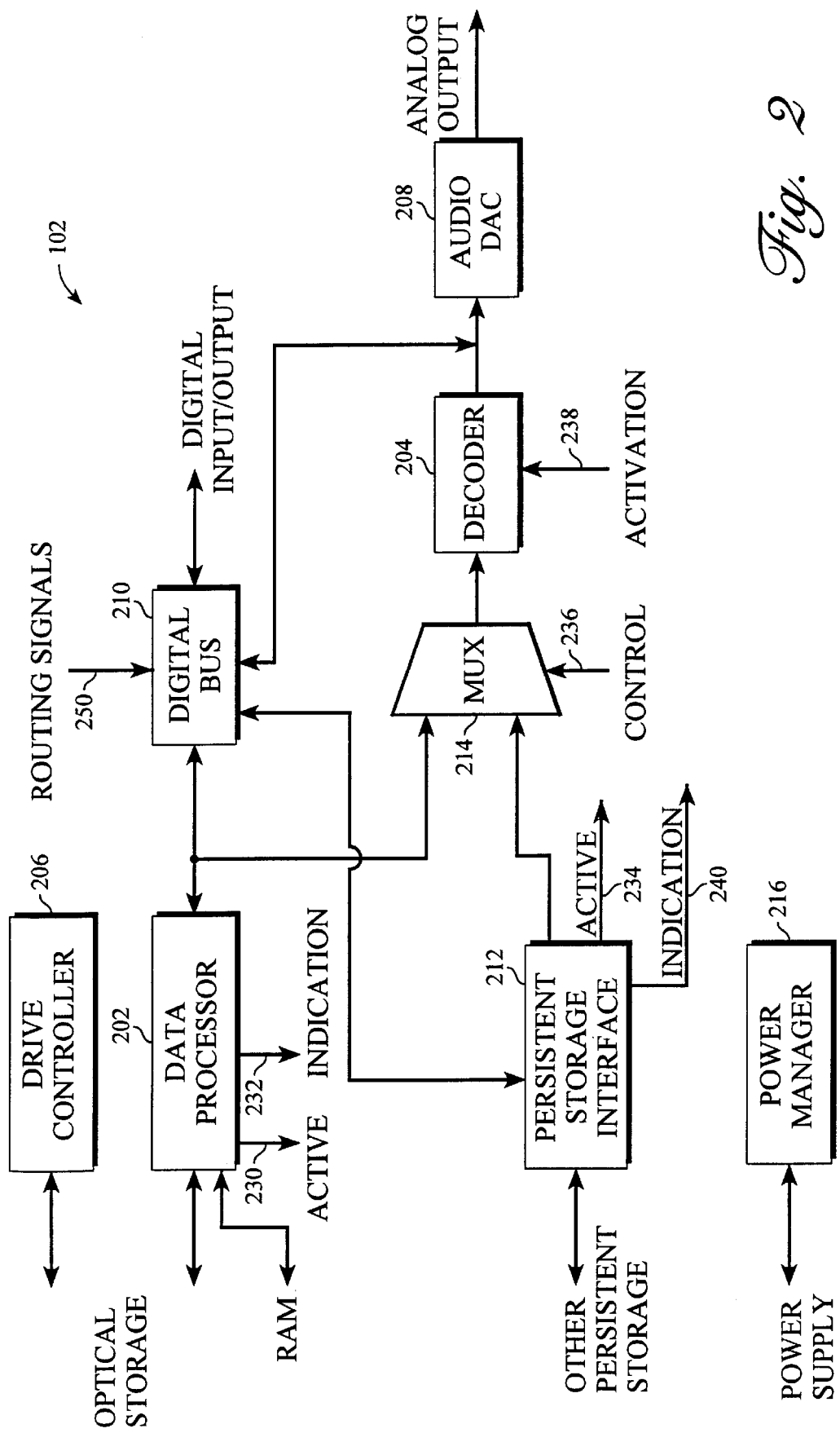
FIG. 2 is a more detailed block diagram of the multi-functional processing apparatus of the present invention.

An overview of the system 100 has been disclosed. With reference to FIG. 2, the apparatus 102 of the present invention will now be described in greater detail. An initial point to note regarding FIG. 2 is that each of the components shown is coupled to the microprocessor 110 of FIG. 1 via the microprocessor bus 120. For the sake of simplicity, details of these interconnections are not shown; however, it should be understood that they exist. According to one embodiment, all of the components shown in FIG. 2 are implemented as hardware components on a single semiconductor chip.

As shown in FIG. 2, the apparatus 102 comprises a data processor 202, a decoder 204, a drive controller 206, an audio digital-to-analog decoder (DAC) 208, a digital bus 210, a persistent storage interface 212, a multiplexer 214, and a power manager 216. In apparatus 102, the drive controller 206 is the component responsible for controlling the accessing mechanism of the optical storage 104. More specifically, the drive controller 206 generates control signals for causing the accessing mechanism to access and to output a certain set of data from the optical storage medium. In one embodiment, the drive controller 206 controls the accessing mechanism in response to instructions received from the microprocessor 110, which in turn, receives its instructions from a user via the user interface 112. More specifically, when a user instructs the microprocessor 110 via the user interface 112 to render a certain data file (e.g. a certain song) on the optical storage medium, the microprocessor 110 forwards this instruction on to the drive controller 206. In response, the drive controller 206 generates the appropriate control signals to cause the accessing mechanism to access and to output the data associated with the appropriate file.

The component responsible for processing the data outputted from the optical storage medium is the data processor 202. The data processor 202 has a data input for receiving input data from the optical storage medium, and an output. The output of the data processor 202 is coupled to the digital bus 210 and an input of the multiplexer 214. The data processor 202 is also coupled to the RAM 108 (FIG. 1) to enable the data processor 202 to utilize the RAM 108 during data processing.

In processing the input data received from the optical storage medium, the data processor 202 performs several functions. First and foremost, the data processor 202 makes a determination as to whether the input data is encoded or unencoded. According to one embodiment, input data is sent to the data processor 202 in blocks, and each block contains information which specifies the format of the block. By checking this information, the data processor 202 can determine whether the block is in an encoded format (e.g. is in MP3 format) or an unencoded format (e.g. WAVE format). Depending upon whether a block is encoded or unencoded, the data processor 202 will process the block differently. In processing a block, the data processor 202 may generate several signals which are sent to the microprocessor 110. These signals include an Active signal 230, indicating that the data processor 202 is currently processing a data block, and an Indication signal 232, indicating that the data processor 202 is currently processing an encoded data block. These signals are used by microprocessor 110 to control the operation of the apparatus 102. The specific operation of the data processor 202 will be described in greater detail in a later section.

In addition to determining whether a set of input data is encoded or unencoded, the data processor 202 may also perform error correction on the input data, as well as signal processing. For purposes of the present invention, the error correction may be performed in accordance with any error correction scheme, and the signal processing may be performed to achieve any desired filtering or signal enhancement purpose. As mentioned previously, to provide protection against copying, the data files stored on the optical storage 104 may be encrypted. If that is the case, then the data processor 202 may perform an addition decryption function to decrypt the data prior to processing. These and other functions may be performed by the data processor 202 using methods well known to those of ordinary skill in the art.

The decoder 204 is the component responsible for decoding any encoded data processed by the apparatus 102. The decoder 204 has an input coupled to the output of the multiplexer 214, and an output coupled to the digital bus 210 and the DAC 208. The decoded 204 decodes any encoded data appearing at its input, and provides a set of decoded data at its output. In accordance with the present invention, decoder 204 may be a decoder for decoding data encoded in accordance with any encoding scheme. In one embodiment, decoder 204 takes the form of an MP3 decoder, such as that found in many commercially available DVD players; however, it should be noted that decoder 204 may take on many other forms.

The persistent storage interface 212 is the component responsible for interfacing with persistent storage media 106 (FIG. 1) other than the optical storage medium. As mentioned previously, these other persistent storage media include non-volatile memory, flash memory, magnetic storage, and PCMCIA cards. The interface 212 has an input/output port coupled to the persistent storage 106 for exchanging information therewith, an output port coupled to an input of the multiplexer 214, and an input/output port coupled to the digital bus 210.

For purposes of the present invention, the interface 212 performs two major functions. First, it provides a mechanism for retrieving data from the persistent storage 106 and forwarding it on to the decoder 204 and/or the digital bus 210. In this regard, it is very similar to the data processor 202. Namely, when interface 212 receives a set of input data from the persistent storage 106, it makes a determination (in the same manner as that described in connection with the data processor 202) as to whether the input data is encoded or unencoded. Depending upon whether the data is encoded or unencoded, the interface 212 processes it differently (the operation of the interface 212 will be described in greater detail in a later section). In processing a set of input data, the interface 212 may generate several signals which are sent to the microprocessor 110. These signals include an Active signal 234, indicating that the interface 212 is currently processing a set of input data, and an Indication signal 240, indicating that the interface 212 is currently processing an encoded set of data. As described in greater detail below, these signals are used by microprocessor 110 (FIG. 1) to control the operation of the apparatus 102. In addition to determining whether a set of input data is encoded or unencoded, the interface 212 may also perform error correction on the input data, as well as signal processing, just like the data processor 202. In addition, if the input data is encrypted, then the interface 212 may perform a decryption function to decrypt the data prior to processing.

As a second function, the interface 212 provides a mechanism for storing information received from the digital bus 210 or the data processor 202 onto the persistent storage 106 (FIG. 1). This capability enables the apparatus 102 to copy data files stored on the optical storage medium onto the persistent storage 106. It also enables the apparatus 102 to receive input data via the digital bus 210 and to store this input data onto the persistent storage 106 for subsequent access. In one embodiment, the interface 212 takes the form of a PCMCIA controller; however, it should be noted that interface 212 may take on many other forms.

The multiplexer 214 is the component responsible for controlling which set of data is forwarded to the decoder 204. More specifically, the multiplexer 214 has one input coupled to the output of the data processor 202, another input coupled to the output of the persistent storage interface 212, and an output coupled to the input of the decoder 204. Which multiplexer input is coupled to the multiplexer output is determined by the state of the Control signal 236 provided by the microprocessor 110. The state of the Control signal 236 is in turn determined by the states of the Active signals 230, 234 of the data processor 202 and the persistent storage interface 212, respectively. If the Active signal 230 of the data processor 202 is asserted, then the state of the Control signal 236 will be such that it causes the output of the data processor 214 to be coupled to the output of the multiplexer 214. On the other hand, if the Active signal 234 of the persistent storage interface 212 is asserted, then the state of the Control signal 236 will be such that it causes the output of the interface 212 to be coupled to the output of the multiplexer 214. In this manner, the multiplexer 214 controls which set of data is sent to the input of the decoder 204.

The digital bus 210 acts as the digital input/output of the apparatus 102. The digital bus 210, which may be a universal serial bus (USB), an integrated disk electronics (IDE) bus, a small computer system interface (SCSI) bus, or some other type of bus, is capable of receiving input signals from the data processor 202, the decoder 204, the persistent storage interface 212, and an external digital device (such as a computer), and routing these signals to other components, such as the persistent storage interface 212, the DAC 208, and the external digital device (not shown). The routing of these signals is controlled by the internal routing logic of the digital bus 210, which in turn is controlled by routing signals 250 from the microprocessor 110. By sending the proper routing signals 250 to the digital bus 210, the microprocessor 110 can enable the apparatus 102 to perform many different functions. These will be described in greater detail in a later section.

The audio DAC 208 acts as the analog output of the apparatus 102. The DAC 208 receives digital input signals from the data processor 202 and the decoder 204 and converts them into analog signals. These analog signals are thereafter provided to an external analog device, such as a speaker, to drive the device.

The power manager 216 is the component responsible for efficiently managing power consumption of the overall system 100. In an implementation where the system 100 is a portable device, efficient power management is an important consideration because it can significantly prolong battery life. To minimize power consumption, power manager 216 monitors on a constant basis the operation of the components in the system 100. Any component that is not in use and that is determined by the power manager 216 to be safe to deactivate is deactivated by the power manager 216. When these components are needed again, the power manager 216 automatically reactivates them. For purposes of the present invention, power manager 216 may implement any desired power management strategy to minimize the power consumption of the overall system 100.

The physical structure of the apparatus 102 of the present invention has been disclosed. With reference to FIGS. 1 and 2, the operation of the apparatus 102 will now be described. Suppose that a user inserts an optical storage medium into the optical storage 104 and instructs the microprocessor 110, via the user interface 112, to render a certain file stored on the medium. Suppose further that the user specifies that he/she wishes the output to be in both digital and analog form. In such a case, the microprocessor 110 forwards the user instruction on to the drive controller 206, and the drive controller 206 generates the control signals necessary for causing the accessing mechanism of the optical storage 104 to access and to output the data associated with the file to the data processor 204.

In response to the input data, the data processor 202 asserts the Active signal 230 to indicate that it is currently processing a set of input data. The data processor 202 then determines whether the input data is encoded or unencoded (by checking the format information accompanying the data, as previously described). If the input data is encoded, then the data processor 202 asserts the Indication signal 232, and provides at its output a set of encoded data. This encoded data may be the input data received by the data processor 202 from the optical storage medium, or it may be data derived from the input data after the data processor 202 has performed some processing on the input data. In either case, a set of encoded data is provided at the output of the data processor 202.

In response to the signals 230, 232 generated by the data processor 202, the microprocessor 110 generates control signals to control the other components of the apparatus 102. Specifically, in response to the Active signal 230, the microprocessor 110 sets the state of the Control signal 236 to the multiplexer 214 such that the output of the data processor 202 is coupled to the input of the decoder 204. Thus, the encoded data from the data processor 202 is forwarded to the decoder 204. In addition, in response to the Indication signal 232, the microprocessor 110 generates the Activation signal 238 to cause the decoder 204 to be activated. In response to the encoded data and the Activation signal 238, the decoder 204 decodes the encoded data and provides a set of decoded data at its output. This decoded data is sent both to the digital bus 210 and to the DAC 208 to be converted into an analog signal. Since the user specified that both a digital and an analog output should be provided, the microprocessor 110 generates the proper routing signals 250 to cause the bus 210 to route the output data from the decoder 204 to the digital output of the apparatus 102. Thus, the decoded data may be rendered to a user using either a digital or an analog external device. In the manner described, an encoded set of data from the optical storage medium is properly processed by the apparatus 102.

Suppose now that the input data from the optical storage medium is unencoded. In such a case, the data processor 202 still asserts the Active signal 230 to indicate that it is currently processing a set of input data; however, it does not assert the Indication signal 232 since the input data is unencoded. This causes the microprocessor 110 to not assert the Activation signal 238 to the decoder 204; hence, the decoder 204 is left unactivated. Where the input data is unencoded, the data processor 202 processes the input data in accordance with a signal processing strategy, and provides at its output a set of processed data. This processed data is sent to the digital bus 210. Since the user has specified that the output should be provided in both digital form and analog form, the microprocessor 110 sends the appropriate routing signals 250 to the digital bus 210 to cause the bus 210 to route the processed data from the data processor 202 to both the digital output port of the apparatus 102 and to the DAC 208. The processed data may then be rendered to a user using either a digital or an analog external device. In the manner described, an unencoded set of data from the optical storage medium is properly processed by the apparatus 102. As this description shows, the apparatus 102 of the present invention is capable of properly and automatically processing both encoded and unencoded data from a storage medium.

Suppose now that rather than inserting an optical storage medium into the optical storage 104, a user couples a PCMCIA card with the persistent storage interface 212, and instructs the microprocessor 110, via the user interface 112, to render a certain data file stored on the card. Suppose further that the user specifies that he/she wishes the output to be in both digital form and analog form. In such a case, the microprocessor 110 forwards the instruction on to the interface 212, and the interface 212 responds by accessing the data file on the card.

Upon receiving the data from the data file, the interface 212 asserts the Active signal 234 to indicate that it is currently processing a set of input data. The interface 212 then determines whether the input data is encoded or unencoded (by checking the format information accompanying the data). If the input data is encoded, then the interface 212 asserts the Indication signal 240, and provides at its output a set of encoded data. This encoded data may be the input data received by the interface 212 from the PCMCIA card, or it may be data derived from the input data after the interface 212 has performed some processing on the input data. In either case, a set of encoded data is provided at the output of the interface 212.

In response to the signals 234, 240 generated by the interface 212, the microprocessor 110 generates control signals to control the other components of the apparatus 102. Specifically, in response to the Active signal 234, the microprocessor 110 sets the state of the Control signal 236 to the multiplexer 214 such that the output of the interface 212 is coupled to the input of the decoder 204. Thus, the encoded data from the interface 212 is forwarded to the decoder 204. In addition, in response to the Indication signal 240, the microprocessor 110 generates the Activation signal 238 to cause the decoder 204 to be activated. In response to the encoded data and the Activation signal 238, the decoder 204 decodes the encoded data and provides a set of decoded data at its output. This decoded data is sent both to the digital bus 210 and to the DAC 208 to be converted into an analog signal. Since the user specified that both a digital and an analog output should be provided, the microprocessor 110 generates the proper routing signals 250 to cause the bus 210 to route the decoded data from the decoder 204 to the digital output of the apparatus 102. Thus, the decoded data may be rendered to a user using either a digital or an analog external device. In the manner described, an encoded set of data from the persistent storage 106 is properly processed by the apparatus 102.

Suppose now that the input data from the persistent storage 106 is unencoded. In such a case, the interface 212 still asserts the Active signal 234 to indicate that it is currently processing a set of input data; however, it does not assert the Indication signal 240 since the input data is unencoded. This causes the microprocessor 110 to not assert the Activation signal 238 to the decoder 204; hence, the decoder 204 is left unactivated. Where the input data is unencoded, the interface 212 processes the input data in accordance with a signal processing strategy, and provides at its input/output a set of processed data to the digital bus 210. Since the user has specified that the output should be provided in both digital form and analog form, the microprocessor 110 sends the appropriate routing signals 250 to the digital bus 210 to cause the bus 210 to route the processed data from the interface 212 to both the digital output port of the apparatus 102 and to the DAC 208. The processed data may then be rendered to a user using either a digital or an analog external device. In the manner described, an unencoded set of data from the persistent storage 106 is properly processed by the apparatus 102.

Suppose now that rather than processing input data from the storages 104, 106, the user wishes to copy a data file from the optical storage 104 onto the persistent storage 106. This may be done by properly routing signals using the digital bus 210. More specifically, when a user instructs the microprocessor 110, via the user interface 112, to copy a data file from the optical storage 104 to the persistent storage 106, the microprocessor 110 forwards the instruction on to the drive controller 206. In response, the drive controller 206 generates the control signals necessary for causing the accessing mechanism of the optical storage 104 to access and to output the data associated with the file to the data processor 204. The data then passes through the data processor 202 (unaltered) to the output of the data processor 202 and on to the digital bus 210. Since the user has specified that a copy operation is desired, the microprocessor 110 sends the proper routing signals 250 to the bus 210 to cause it to route the output signals from the data processor 202 to the input/output of the interface 212. Once the interface 212 has the data, it stores the data onto the persistent storage 106. Data is thus copied from the optical storage 104 onto the persistent storage 106.

Data may also be copied from an external digital device (e.g. a computer) onto the persistent storage 106. This may be achieved by a user by instructing the microprocessor 110 via the user interface 112 to receive and to store a set of external data. In response to this instruction, the microprocessor 110 generates the proper routing signals 250 to cause the bus 210 to route the signals received from the external device to the input/output of the persistent storage interface 212. Once the interface 212 has the data, it stores the data onto the persistent storage 106. External data is thus received and stored. These and other operations may be performed by properly controlling the routing function of the digital bus 210.

Thus far, the apparatus 102 of the present invention has been described only in the context of processing data files. It should be noted, however, that the apparatus 102 may also handle other types of files, such as executable files. When such other files are encountered by either the data processor 202 or the persistent storage interface 212, they are passed unaltered to the digital bus 210 to be forwarded on to an external digital device, such as a computer. Thus, not only can the apparatus 102 be used to process encoded and unencoded data files, it can also act as an interface for accessing and forwarding files in general. This and other functions may be performed by apparatus 102.

At this point, it should be noted that although the invention has been described with reference to specific embodiments, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. An apparatus for automatically processing both encoded and unencoded data from a storage medium, the apparatus comprising:

a data interrogator, having an input terminal that receives and analyzes an indicium representing an input data block, from a storage medium and determines and issues an output signal indicating whether the input is encoded or unencoded with reference to a selected first encoding format and whether the input block is encoded with reference to a selected second encoding format;

a data processor that is to receive and process a data block that is unencoded with reference to the first and second encoding formats; and a data multiplexer, that receives the input data block and the interrogator output signal and implements one of the following procedures:

when the input data block is unencoded with reference to the first and second encoding formats, the multiplexer directs the input block to the data processor;

when the input data block is unencoded with reference to the second encoding format and is encoded with reference to the first encoding format, the multiplexer directs the input data block to a selected first decoder corresponding to the first encoding format, indicating that the input data block, after decoding by the first decoder, is to be received by the data processor;

when the input data block is unencoded with reference to the first encoding format and is encoded with reference to the second encoding format, the multiplexer directs the input data block to a selected second decoder corresponding to the second encoding format, indicating that the input data block, after decoding by the second decoder, is to be received by the data processor; and when the input data block is encoded with reference to the first encoding format and is encoded with reference to the second encoding format, the multiplexer directs the input data block to the first decoder and to the second decoder, in a selected order, indicating that the input data block, after decoding by the first decoder and by the second decoder in the selected order, is to be received by the data processor.

2. The apparatus of claim 1, wherein said storage medium is an optical storage medium.

3. The apparatus of claim 2, wherein said apparatus further comprises a drive controller for controlling access to said optical storage medium.

4. The apparatus of claim 2, wherein at least one of said first decoder and said second decoder is an MP3 decoder.

5. The apparatus of claim 2, further comprising:

a persistent storage interface for interfacing with a persistent storage other than said optical storage medium, the storage interface having an input coupled to receive a second set of input data from the persistent storage, and an output for providing a second set of processed data derived from the second set of input data; and a second multiplexer having a first input coupled to an output of said data processor, a second input coupled to the output of said persistent storage interface, and an output coupled to said data input of at least one of said first decoder and said second decoder, the second multiplexer selectively coupling one of its inputs to its output in response to a control signal.

6. The apparatus of claim 5, wherein said second set of input data is encrypted, and wherein said persistent storage interface decrypts said second set of input data to derive said second set of processed data.

7. The apparatus of claim 6, further comprising a power manager for selectively deactivating one or more selected components which are not in use.

8. The apparatus of claim 1, wherein said data processor comprises a signal transport mechanism.

9. The apparatus of claim 8, wherein said signal transport mechanism is a signal bus for transporting digital signals.

10. The apparatus of claim 9, wherein said output of at least one of said first decoder and said second decoder is coupled to said signal bus to provide a set of decoded data to said signal bus.

11. The apparatus of claim 8, further comprising:

a digital to analog converter having an input coupled to the output of at least one of said first decoder and said second decoder, to convert a set of decoded data from of at least one of said first decoder and said second decoder into a set of analog signals, and to provide the set of analog signals at its output.

12. The apparatus of claim 11, wherein said input of said converter is also coupled to said signal transport mechanism to receive said set of processed data from said data processor, said converter converting said set of processed data into a second set of analog signals, and providing said second set of analog signals at its output.

13. The apparatus of claim 1, wherein at least one of said first encoding format and said second encoding format is drawn from a group of encoding formats consisting of: encryption according to a selected encryption procedure, error detection and correction encoding according to a selected error detection and correction procedure, a selected data compression procedure, and an MP3 encoding procedure.

* * * * *